Nov. 2, 1937.  W. J. FIEGEL  2,097,692
METHOD AND MACHINE FOR FORMING BEARING SHELLS
Filed March 23, 1936  3 Sheets-Sheet 1

INVENTOR
WILLIAM J. FIEGEL
BY
ATTORNEYS

INVENTOR
WILLIAM J. FIEGEL

Nov. 2, 1937.   W. J. FIEGEL   2,097,692
METHOD AND MACHINE FOR FORMING BEARING SHELLS
Filed March 23, 1936   3 Sheets-Sheet 3
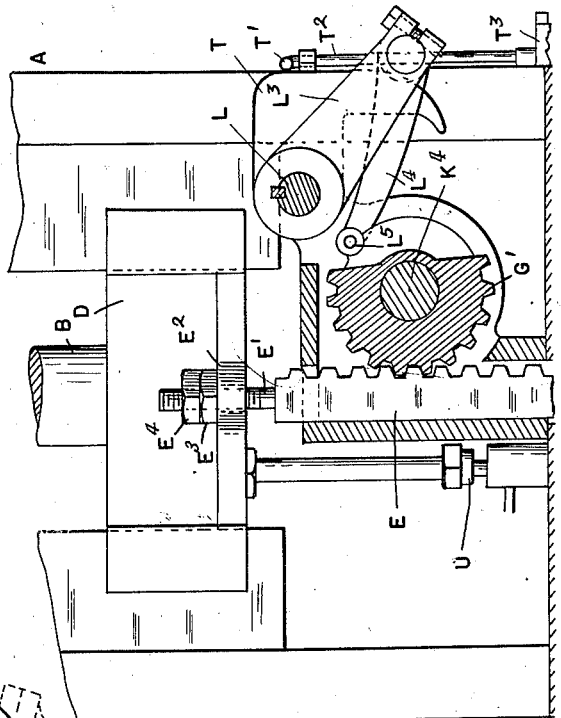
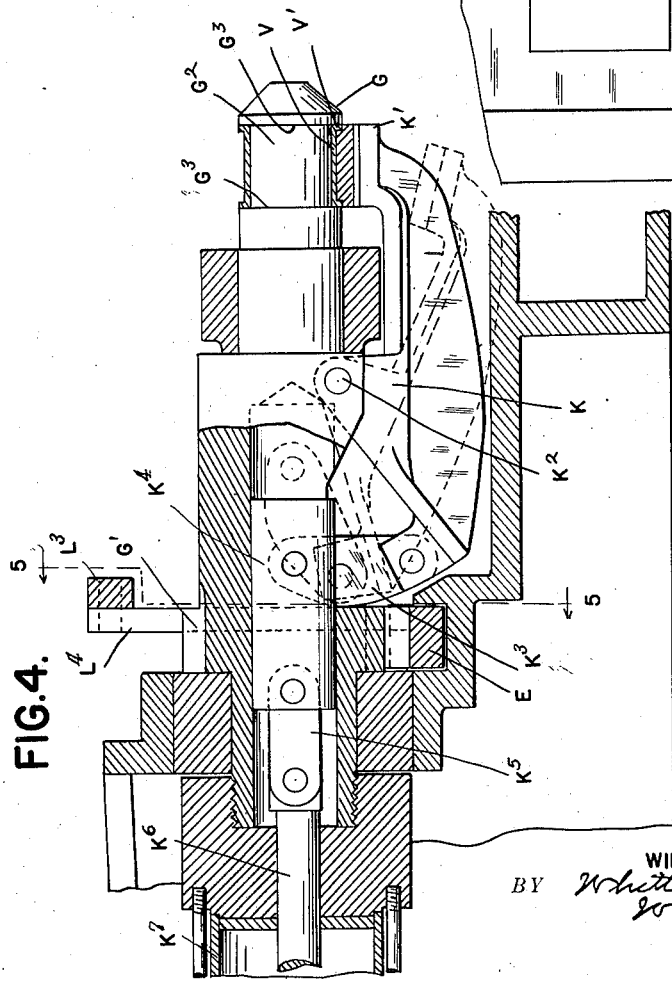
INVENTOR
WILLIAM. J. FIEGEL
BY
ATTORNEYS Patented Nov. 2, 1937

2,097,692

UNITED STATES PATENT OFFICE 2,097,692

METHOD AND MACHINE FOR FORMING BEARING SHELLS

William J. Fiegel, Detroit, Mich., assignor to Bohn Aluminum & Brass Corporation, Detroit, Mich., a corporation of Michigan Application March 23, 1936, Serial No. 70,446

13 Claims. (Cl. 153—40)

The invention relates to the manufacture of bearing shells and more particularly that type comprising segmental cylindrical portions having radially outwardly extending end flanges. It is the object of the invention to form such structures from strip stock, and to this end the invention consists in the method and apparatus as hereinafter set forth.

In the drawings:

Figure 4 is a vertical longitudinal section substantially in the axial plane of the mandrel;

Figure 5 is a section on line 5—5 of Figure 4;

Figure 1:
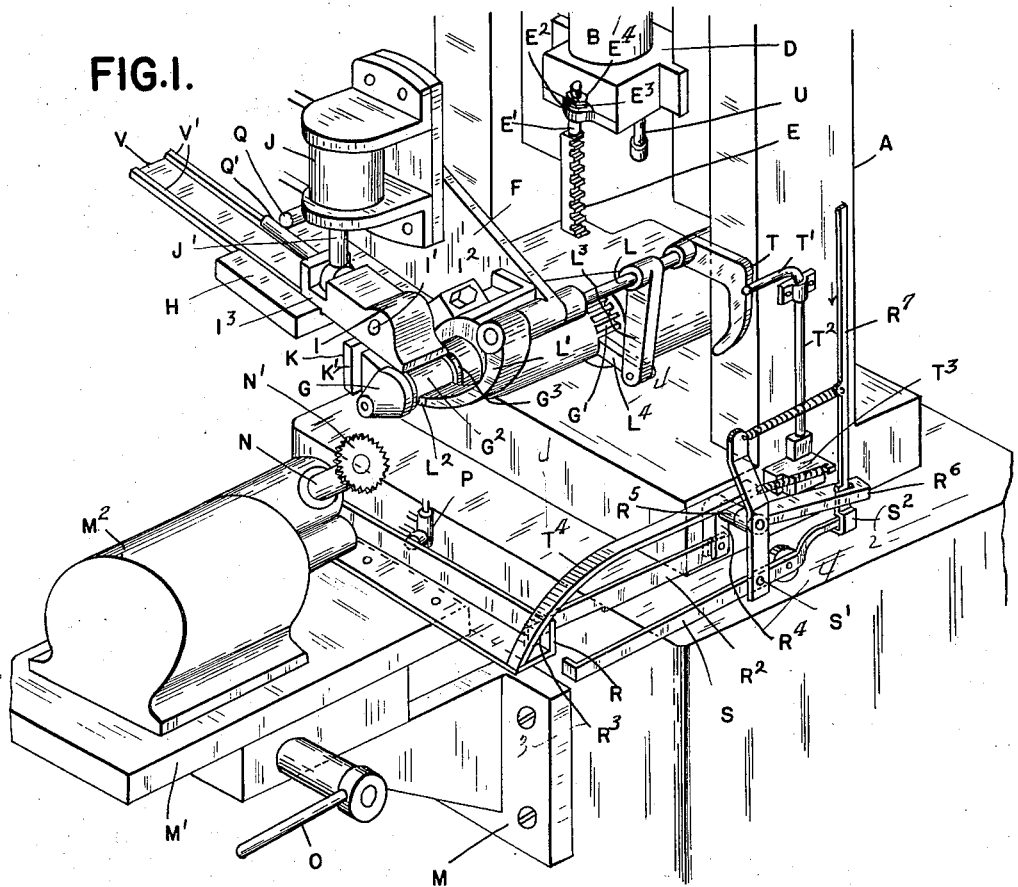
Figure 1 is a perspective view of the machine.
Figure 6:
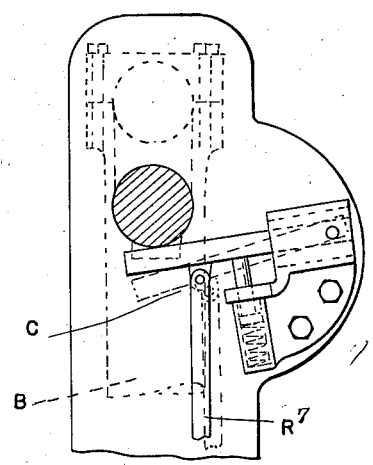
Figure 6 is a sectional elevation of the trip mechanism.

In carrying out my improved method I take a straight strip of material, preferably of channel cross-section, clamp an end portion of this strip to a revoluble mandrel then rotate the mandrel through a partial revolution simultaneously pressing the unformed portion of the strip thereagainst so as to fashion the same to a similar form. I then sever a segment of the desired length from the remainder of the strip but leaving a formed portion integral with the unformed portion. The severed portion is then released by the clamp and the latter returned to clamp the remaining segmental portion to the mandrel after which the operations are repeated. Thus, after the initial operation upon the strip the successive operations in each cycle include: clamping a preformed segmental end portion of the strip to the mandrel; rotating the mandrel through less than one revolution and simultaneously pressing the unformed portion of the strip thereagainst to fashion the same to segmental form; severing a segment from the strip including the preformed portion and a part of the subsequently formed portion; releasing the clamp to remove the severed segment; and returning the clamp to register with the remaining formed portion of the strip.

Generally described, the apparatus for carrying out this method includes a rotary mandrel, clamping means mounted on said mandrel including a segmental clamping jaw, a guideway through which the strip is fed tangent to the mandrel, a presser member for engaging the portion of the strip first contacting the mandrel beyond said guideway, means for intermittently rotating the mandrel through a partial revolution in forward and reverse directions, coacting means for operating the clamp and the presser member, and serving means operating during the interval after completion of the forward rotation of the mandrel and before reverse rotation thereof.

The mechanism may be mounted on an ordinary punch press utilizing the plunger and trip mechanism of this press for actuating and timing the operations. As illustrated, A is the frame of the press; B the plunger therof; and C the trip mechanism, all of the usual construction. D is a clamp secured to the plunger B to which is attached a depending rack E. F is a bracket secured to the frame on which my improved forming mechanism is mounted. This comprises journal bearings for a rotary mandrel G which mandrel is provided with a segmental gear wheel G' positioned to be engaged by the rack E and to be actuated thereby in the upward and downward movement of the plunger B. The mandrel has at its outer end a portion $G^2$ which corresponds in dimensions to the segmental bearing shell to be formed. Thus, there is a cylindrical portion which corresponds to the inner surface of the shell in diameter and in length, and shoulders $G^3$ at opposite ends of this cylindrical portion for bearing against flanged sides of the shell. Extending tangent to the portion $G^2$ is a guideway H over which the stock is fed into engagement with the mandrel. Above this guideway is a presser member I which is pivoted on a pin I' and has a nose portion $I^2$ overlapping the mandrel. This nose portion has a curved segment on its lower face parallel to the mandrel so that when the stock is pressed thereby against the mandrel, it will be fashioned to a corresponding curve. On the opposite side of the pivot I' is a heel portion $I^3$ which at certain times is adapted to bear against the stock and hold it down on the guideway H. J is a pneumatic cylinder, the piston of which is connected by a rod J' with the heel portion of the presser I, the arrangement being such that when the piston moves upward in the cylinder, the nose $I^2$ of the presser will be forced against the mandrel, while the movement of the piston in a downward direction will separate the nose from the mandrel and press the heel against the stock in the guideway.

Pivotally mounted upon the mandrel is a clamp K the forward end of which has a segmental shoe K' conforming to the shape of the portion $G^2$ of the mandrel and engageable therewith. The clamp is pivoted on a pin $K^2$ and at its rear end is connected by a link $K^3$ with a slidable core $K^4$ located in an axial recess within the mandrel.

The core $K^4$ is connected by a link $K^5$ with the plunger $K^6$ of a pneumatic motor $K^7$ mounted on the rear end of the mandrel G, the arrangement being such that when the plunger $K^6$ is moved in an axially outward direction, the core $K^4$ will draw the link $K^3$ radially inward thereby rocking the clamp upon the pivot $K^2$ and withdrawing the segmental shoe $K'$ from engagement with the mandrel. On the other hand, when the plunger $K^6$ is moved in the opposite direction, the shoe $K'$ will be firmly clamped against the work which is in engagement with the portion $G^2$ of the mandrel.

Adjacent to the mandrel is mounted a rocker shaft L having an arm $L'$ terminating in a segmental shoe $L^2$ for engagement with the mandrel. The rocker shaft L is actuated by a rock arm $L^3$ which is connected by a link $L^4$ with a pin $L^5$ connected to the mandrel preferably in an interruption or cut-away portion of the gear $G'$. These parts are so proportioned that when the mandrel is rotated in a clockwise direction (Figures 2 and 3), the arm $L'$ will be swung inward and at the termination of this movement will bear against the mandrel. On the other hand, when the mandrel is rotated anti-clockwise the arm $L'$ will be moved outward so as to clear the path of the clamp K.

At the front of the frame A is a bracket M on which is mounted a carriage $M'$ carrying a motor $M^2$. This motor is geared to drive a transversely extending arbor N carrying a saw $N'$. This saw is arranged in an axial plane of the arbor G and at an oblique angle to the plane of the guideway H. It is also located to register with a longitudinal slot $N^2$ in the arbor when the latter is in the position indicated in Figure 3. The carriage $M'$ is moved parallel to the axis of the arbor by suitable means (not shown) mounted on the bracket M and actuated by a crank handle O extending at one side thereof. The arrangement is such that by moving the crank handle O through a one-half revolution the saw $N'$ will travel through the slot $N^2$ across the portion $G^2$ of the arbor and will, therefore, sever any strip which is wound upon said portion.

Figure 3:
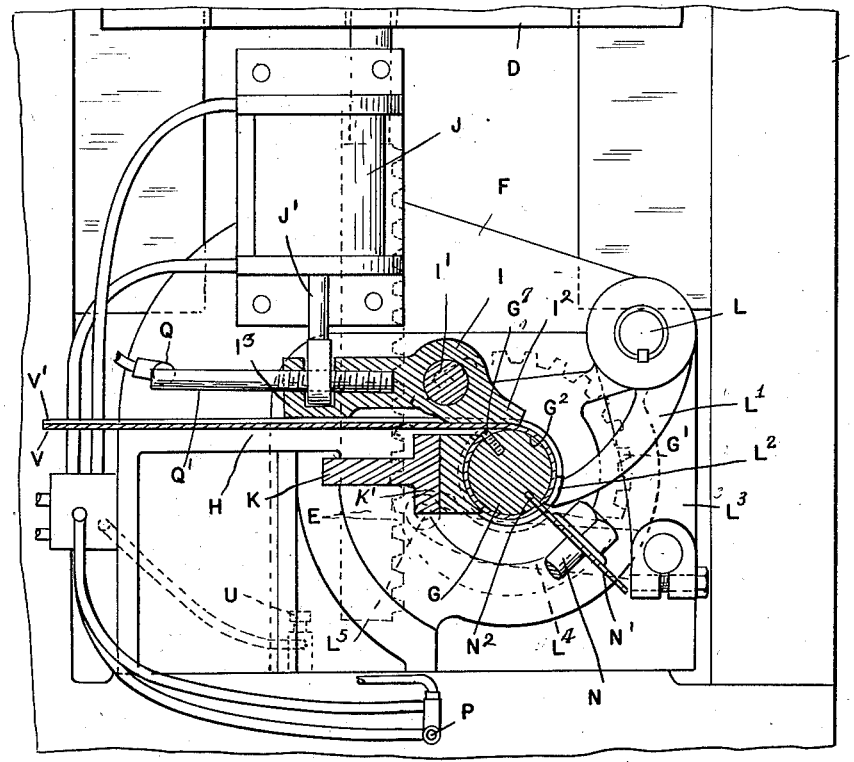
Figures 2 and 3 are cross-sections showing the relative positions of the operating parts at different points in the cycle.
Figure 2:
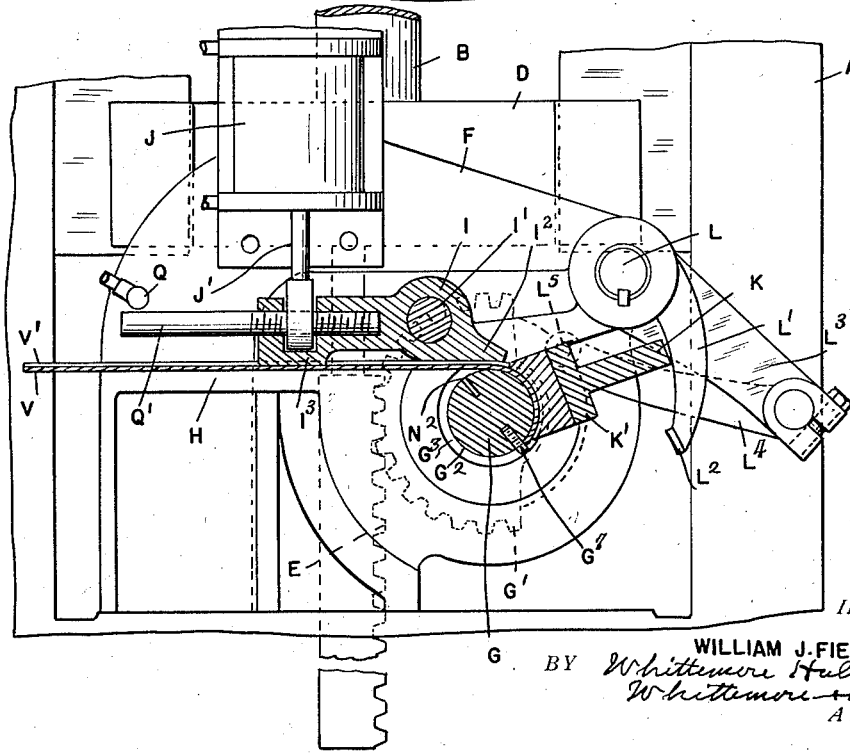

With the parts as thus far described, it will be understood that every time the press is tripped the descending plunger B will actuate the rack E which in turn will actuate the pinion $G'$ rotating the arbor from the position shown in Figure 3 to the position shown in Figure 2. Also, in the upward movement of the plunger B this same mechanism will rotate the mandrel G from the position shown in Figure 2 back to the position shown in Figure 3 which completes the cycle and stops the press in the usual manner. Thus, normally when the press is not in operation the parts will be in the position shown in Figure 3. The operation of the pneumatic motors J and K is automatically controlled in the following manner:

In the position shown in Figure 3, the plunger $J'$ of the motor J is drawn upward thereby withdrawing the heel $I^3$ from contact with the strip and pressing the nose portion $I^2$ downward against the strip between the same and the mandrel. In the same position shown in Figure 3, the clamp K is in engagement with the end portion of the strip which has been wound around the mandrel, this being effected by the rearward movement of the plunger $K^6$ of the pneumatic motor $K^7$. The carriage $M'$ is also withdrawn from engagement with the mandrel or in the position shown in Figure 1. This is the starting position and the sequence of operations during one complete cycle is as follows:

The operator first takes hold of the crank handle O moving it upward and rearward which causes the travel of the carriage $M'$ and the saw $N'$, the latter being driven by the motor $M^2$. This will carry the saw through the slot $N^2$ in the mandrel and will sever the strip which is wound around the mandrel. During this operation, one portion of the strip is clamped by the shoe $K'$, while the other portion of the strip on the opposite side of the saw $N'$ and adjacent thereto, is clamped by the shoe $L^2$. The travel of the carriage $M'$ is sufficient to completely sever the strip on the mandrel and in the final movement of the carriage it presses against a button P on the frame which controls the pneumatic motor J. This will cause the downward movement of the plunger $J'$ pressing the heel $I^3$ against the strip and separating the nose $I^2$ from the portion of the strip surrounding the mandrel. This operation will also control the pneumatic motor $K^7$ through the medium of a valve operating button Q, which in the position shown in Figure 3 is engaged by an arm $Q'$ projecting rearward from the member I. As soon as the heel $I^3$ is pressed downward as just described, the arm $Q'$ is disengaged from the button Q which effects the reversal of the pneumatic motor $K^7$ moving the plunger $K^6$ to the right (Figure 4) and through the link $K^5$, core $K^4$ and link $K^3$, rocking the clamp K into the position shown in dotted lines in this figure, where the shoe $K'$ is withdrawn from the mandrel. This permits the severed segment of the blank to drop away from the mandrel.

The operator next actuates the handle O in the reverse direction, moving the carriage $M'$ outward into a position where the saw $N'$ is withdrawn from the slot $N^2$ in the mandrel. At the completion of this movement the clutch of the press is tripped through the following mechanism. R is a bracket on the carriage $M'$ having a slot therein through which is passed a link $R^2$ having a hook $R^3$ at its outer end. The inner end of the link is connected to a rock arm $R^4$ on a rockshaft $R^5$ which has a bell crank arm $R^6$ connected to a vertically extending rod $R^7$ for operating the trip mechanism C of the press. This will start the operation of the press but to avoid any danger of such operation while the saw is in engagement with the mandrel there is provided a locking mechanism of the following construction. S is a lever fulcrumed at $S'$ and having its rear end in engagement with a bearing $S^2$ at the lower end of the rod $R^7$. The forward end of the lever S is so positioned that when the bracket R is in a position to trip the press and to pull downward the rod $R^7$ the lever S will be swung upward interposing its forward end in the path of the bracket R and precluding a forward movement of the carriage. There is also a cam T secured to the plunger B which during the descent of this plunger engages with the rock arm $T'$ on a rockshaft $T^2$ swinging a stop $T^3$ on the lower end of this shaft into the path of an arm $T^4$ projecting rearward from the carriage $M'$. This stop will thus remain in the path of said arm during the entire movement of the press, thereby preventing the operator from accidentally moving the carriage into interference with the mandrel.

The mandrel G has projecting therefrom a stop shoulder $G^7$ which as shown in Figure 3 is in contact with the upper edge of the segment of the work clamped by the shoe K'. After the clamp K is released and the severed segment dropped from the mandrel as above described, and after the press has been tripped, the mandrel will be rotated in an anti-clockwise direction by the descent of the plunger B and the engagement of the rack E with the gear segment G'. This, as previously described, will bring the parts into the position shown in Figure 2. Here the stop G⁷ will contact with the edge of the strip still remaining on the mandrel slightly displacing the same and slightly bowing the unformed portion of the strip which is clamped at its rear end by the heel I⁴. At the completion of the downward movement of the plunger B, the clamp D strikes against a button U which through pneumatic connections (not shown) effects a reversal of the motors J and K moving upward the plunger J' to release the heel I⁴ and to press downward the nose I² and also moving rearward the plunger K⁶ and swinging the clamp K to a position where the shoe K' clamps the segment of the strip which surrounds the mandrel. On account of the bowing of the strip and the slight separation of the segment from the mandrel due to the pressure of the stop G⁷ the shoe K' when clamped will press the segment in firm contact with said stop. Also, the nose I² will be pressed downward on the entering portion of the strip holding it under considerable pressure against the mandrel. The operation of the pneumatic motors J and K and the parts connected therewith will require a slight time interval and as the movement of the press is continuous, I preferably provide a lost motion connection between the rack E and the bracket D. This is formed by a shank E' on the upper end of the rack which passes through an apertured ear E² on said bracket D, the upper end of the shank being threaded and engaged by lock nuts E³, E⁴. This not only gives an interval of rest of the rack after the completion of the downward movement of the plunger B and during the initial upward movement thereof, but also forms a means for adjusting the length of the segment which is wrapped around the mandrel. Thus, where this lost motion is cut down, the mandrel will be revolved through a slightly greater angle than when the lost motion is enlarged, so that the operator is enabled to make suitable adjustment for the particular length desired.

An important feature in my method of forming the segmental shells is that the severing of each shell from the adjacent portion of the strip is in the central portion of a formed segment. This will insure that the opposite end portions of each segmental shell will be of the same curvature as the central portion thereof, whereas if the severing occurred adjacent to the unformed portion of the strip, the end portion of the segment might be of slightly different curvature. It will also be observed that each of the formed shells is composed of segments that are successively formed or in other words, each shell is composed of a preformed segment which is still integral with the strip and a subsequently formed segment which is then severed from the strip.

The machine and the method above described would be applicable to the formation of segmental shells without flanges, but I have illustrated a strip V having flanges V' at opposite sides thereof. These flanges will be held from distortion during the forming of the strip inasmuch as they are arranged between the opposite edges of the shoe K' and the shoulders G³ at opposite ends of the portion G² of the mandrel around which the strip is wound.

What I claim as my invention is:

1. In a method of forming arcuate bearing shells, the steps of clamping a preformed arcuate portion of a strip to a mandrel, rotating said mandrel to wind thereon an additional arcuate portion, severing a segment including the preformed portion and a part of the subsequently formed portion, releasing the clamp to disengage the severed segment, reversely rotating said mandrel to its original position and repeating the operations to form successive shells.

2. In a method of forming arcuate bearing shells, the steps of clamping a preformed arcuate portion of a strip to a mandrel, rotating said mandrel to wind thereon an additional arcuate portion, clamping the last wound portion to the mandrel, severing between said clamped portions the severed segment including the preformed portion and a part of the subsequently wound portion, releasing the clamps, returning the mandrel to its initial position, and repeating the operations to form from the continuous strip successive shells.

3. In a method of forming arcuate bearing shells, the steps of winding a strip on a mandrel, severing a segment from said strip both ends of said segment being separated from wound portions of the strip extending beyond the same so as to form a curve of the same radius from end to end of the severed segment.

4. In a method of forming arcuate bearing shells, the steps of winding a flanged strip about a grooved mandrel with the flanges of the strip adjacent to the opposite sides of the groove and with a shoe between said flanges resiliently pressed against the strip during the winding thereof and severing a segment of the wound strip from the remainder of the strip each end of the severed segment being separated from a wound portion extending beyond the same.

5. The combination with a mandrel, of means for intermittently imparting to said mandrel a rotary oscillation of less than one revolution, a clamp mounted on said mandrel for engaging the end portion of a strip whereby said strip will be wound about the mandrel during rotation thereof in one direction, means operable after the winding of the strip for severing a segment of the wound portion from the remaining wound portion, and controlling means for said clamp adapted to release the same after the severing of said segment to disengage the latter from the mandrel and to re-engage the clamp with the remaining wound portion at the opposite end of the oscillatory movement.

6. The combination with a mandrel, of means for intermittently imparting to said mandrel a rotary oscillation of less than one revolution, a clamp mounted on said mandrel for engaging the end portion of a strip whereby said strip will be wound about the mandrel during the subsequent rotation thereof in one direction, a presser member for holding the strip against the mandrel during the winding thereof, means operable during the interval of rest for severing a segment of the wound strip from the remaining wound portion thereof, a second clamp for holding the strip to the mandrel adjacent to the line of severance, controlling means for releasing said first clamp after the severing of the segment and for re-engaging the same after the reverse rotation, and means controlling the second clamp for withdrawing the same from the path of said first clamp during oscillation of the mandrel.

7. The combination with a mandrel, of means for imparting to said mandrel a rotary oscillation of less than one revolution, a clamp mounted on said mandrel for engaging the end portion of a strip whereby said strip will be wound about the mandrel during rotation thereof in one direction, means operable during the interval of rest between oscillations for severing a segment of the wound portion from the remaining wound portion, means operable at the completion of the severing operation for releasing said clamp to disengage the severed segment, means subsequently operable for starting another oscillation, and means operable after the completion of one phase of said oscillation for re-engaging said clamp with the remaining wound portion whereby in the subsequent phase of the oscillation another portion of the strip will be wound on the mandrel.

8. The combination with a mandrel, of means for intermittently imparting to said mandrel a single rotary oscillation of less than one revolution with a slight interval of rest between reverse phases of said oscillation, a clamp mounted on said mandrel for engaging the end portion of a strip, means for actuating said clamp to engage said strip during the interval of rest between phases of the oscillation whereby said strip will be wound about the mandrel during the return phase, means manually operable after the completion of the oscillation for severing a segment of the wound portion from the remaining wound portion, and means automatically operated after the completion of the severing operation for first releasing said clamp to disengage said segment from the mandrel and to then start another oscillation.

9. The combination with a mandrel having a longitudinal slot along one side thereof, of means for intermittently imparting to said mandrel a single rotary oscillation of less than one revolution with a slight interval of rest between reverse phases of said oscillation, a clamp mounted on said mandrel for engaging the end portion of a strip, means for engaging said clamp with said strip during the interval of rest between phases of said oscillation whereby said strip will be wound about the mandrel during the return phase, a carriage mounted to travel parallel to the axis of said mandrel, a saw mounted on said carriage adapted to register with the slot in said mandrel when the latter is at rest between oscillations thereof, means for reciprocating said carriage to pass said saw through said slot and to thereby sever a segment of the wound strip from the remaining portions thereof, means operable after the severing of the strip for releasing said clamp to disengage the severed segment and to free the strip from the mandrel, and means operable after the return of the carriage and disengagement of the saw from said slot to impart another oscillation to said mandrel.

10. The combination with a rotary mandrel, of a gear on said mandrel, a rack in mesh with said gear, a plunger for actuating said rack, a drive mechanism for imparting to said plunger a single reciprocation and to thereby impart a corresponding oscillation to the mandrel which is less than one revolution, a clamp mounted on said mandrel for engaging the end portion of the strip to be wound thereon, means controlling said clamp whereby the strip is wound during one phase of the oscillation and is released during the opposite phase, and means operable between the winding phase and the opposite phase for severing a segment of said wound strip.

11. The combination with a rotary mandrel, of a gear on said mandrel, a rack in mesh with said gear, a plunger having a lost motion connection with said rack, means for imparting to said plunger a single reciprocation whereby said mandrel is given a corresponding oscillation through less than one revolution, a clamp mounted on said mandrel for engaging the end portion of the strip to be wound thereon, means operable during the interval of rest of said mandrel occasioned by the taking up of the lost motion between said plunger and rack for operating said clamp to engage said strip whereby the strip is wound on the mandrel during the return phase of the oscillation, means operable after the completion of the reciprocation of said plunger for severing a segment of the wound strip from the remainder thereof, and means operable after the completion of said severing operation for imparting another reciprocation to said plunger.

12. The combination with a rotary mandrel, of a gear mounted thereon, a rack in mesh with said gear, a reciprocatory plunger for actuating said rack to impart to said mandrel a corresponding oscillation through less than one revolution, a clamp mounted on said mandrel for engaging the end portion of the strip to be wound thereon, a lost motion connection between said plunger and rack permitting an interval of rest between phases of the oscillation of said mandrel, means operable during said interval for engaging the clamp with said strip whereby the latter is wound during the return phase, means for severing a segment of the wound strip from the remainder thereof, said means being operable after the completion of the reciprocation of said plunger, and means operable subsequent to the severing of said strip for releasing said clamp to disengage the severed portion and for imparting another reciprocation to said plunger.

13. The combination with a rotary mandrel, of a gear on said mandrel, a rack in mesh with said gear, a reciprocatory plunger for actuating said rack to effect a corresponding oscillation of said mandrel through less than one revolution, a lost motion connection between said rack and plunger for effecting an interval of rest between phases of the oscillation, and means for adjusting the amount of said lost motion for varying the arc of oscillation.

WILLIAM J. FIEGEL.